May 26, 1953     T. E. HAYES     2,639,858
MULTIVIBRATOR TUBE CIRCUITS
Filed Sept. 13, 1950     2 Sheets—Sheet 1
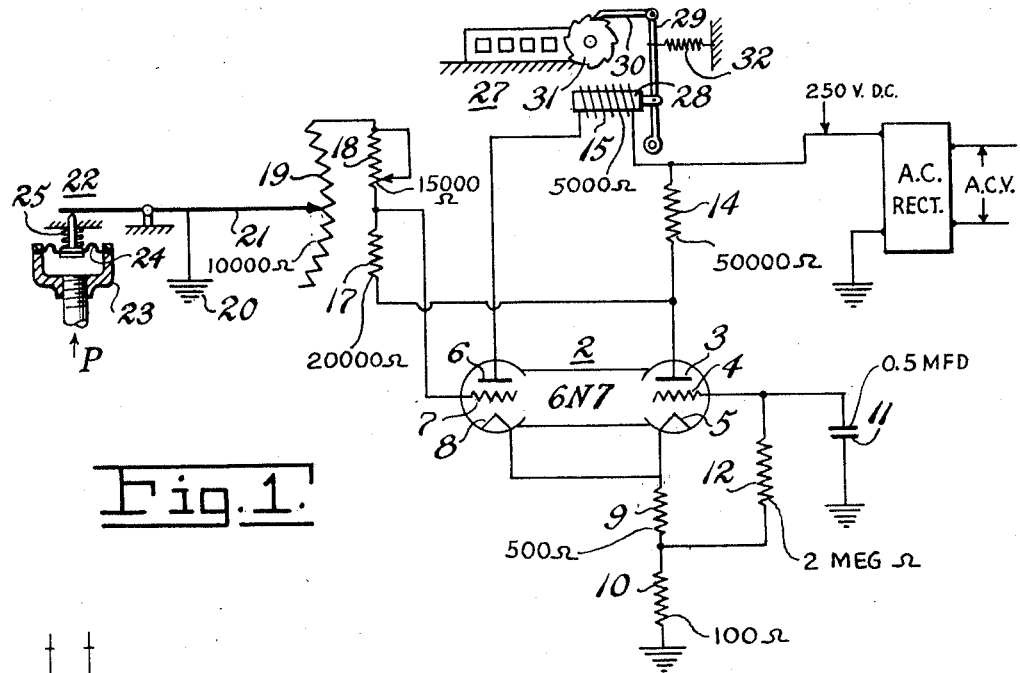
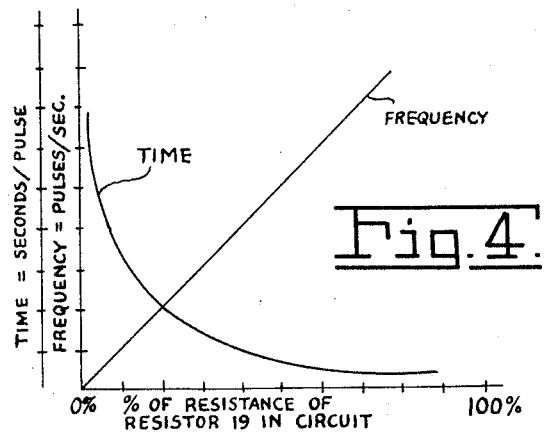
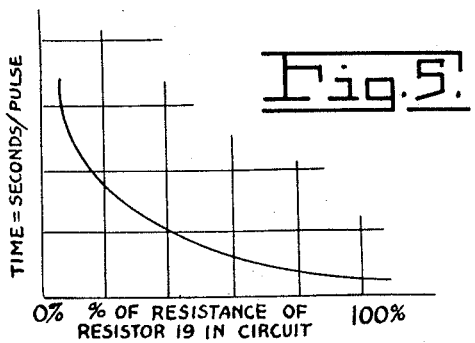
INVENTOR.
THOMAS E. HAYES
BY
Zugelter & Zugelter
Attys.

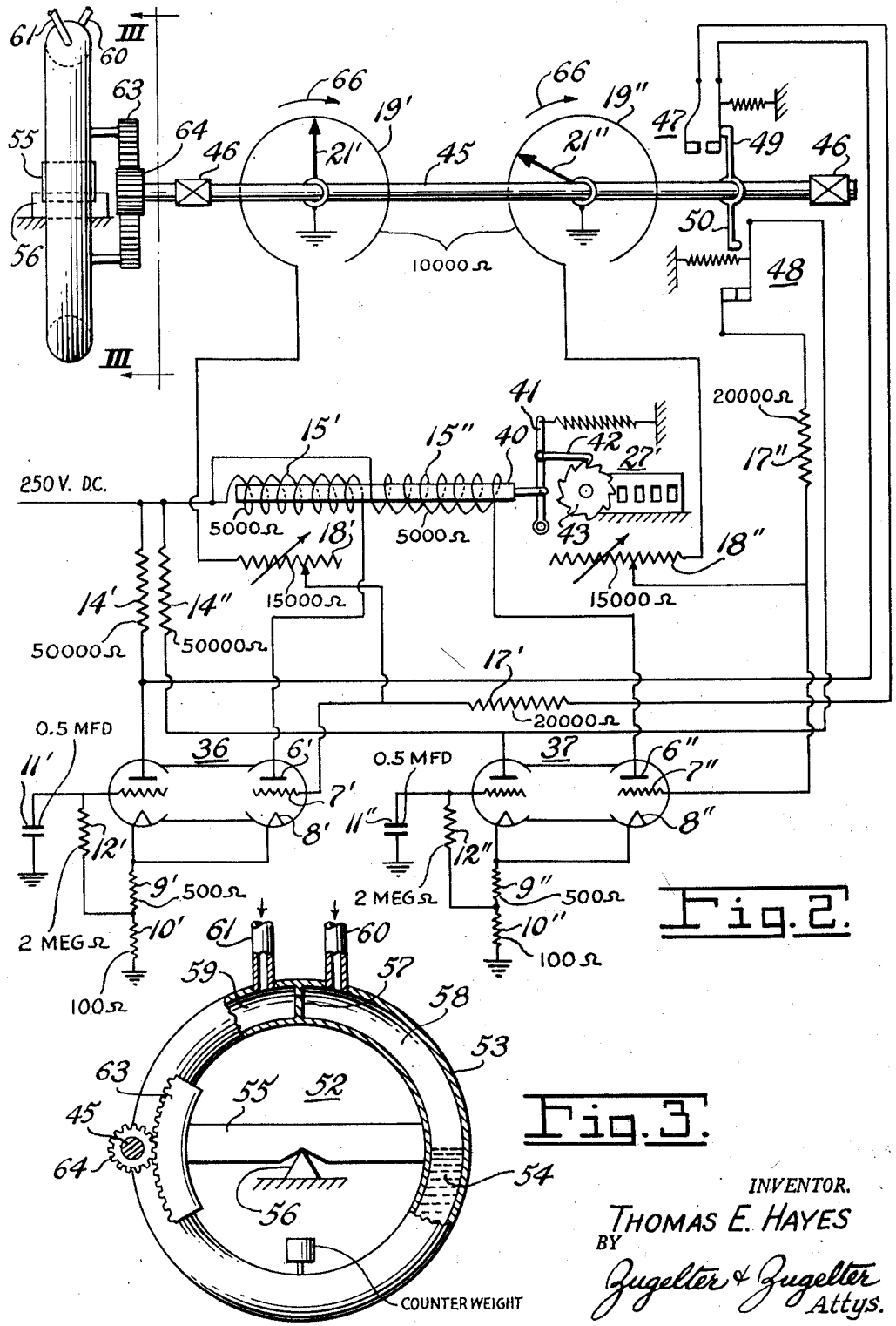

Patented May 26, 1953

2,639,858

UNITED STATES PATENT OFFICE 2,639,858

MULTIVIBRATOR TUBE CIRCUITS

Thomas E. Hayes, Orrville, Ohio, assignor to Hagan Corporation, Pittsburgh, Pa., a corporation of Pennsylvania Application September 13, 1950, Serial No. 184,578

11 Claims. (Cl. 235—61)

This invention relates to multi-vibrator tube circuits and more particularly to an improved circuit whereby the frequency of vibration or oscillation may be conveniently and accurately controlled.

An object of this invention is to provide a multi-vibrator tube circuit that is so arranged that its frequency of vibration or oscillation may be so controlled that the relationship between frequency and per cent of total control resistance will be substantially linear. Another object of the invention is to provide a multi-vibrator tube circuit having control means for controlling the frequency of vibration thereof that is particularly adapted to be actuated by devices which are responsive to a variable condition whose magnitude is to be measured or controlled, or both.

Another object of the invention is to provide a plurality of multi-vibrator tube circuits and a control means for controlling the frequency of vibration of each circuit that is so arranged that one tube circuit will function over a part of a total range of variable conditions to be measured and/or controlled, and the other will function over another portion of the range whereby the combined results of each circuit will more nearly approach a desired relationship of frequency to per cent of total control resistance.

The above and other objects of the invention will, in part, be apparent, and will, in part, be obvious from the following description taken in conjunction with the accompanying drawings, in which:

Fig. 1 is a more or less diagrammatic view of a multi-vibrator tube circuit and a control means therefor arranged and constructed in accordance with an embodiment of the invention;

Fig. 2 is a more or less diagrammatic view of a tube circuit embodying a plurality of multi-vibrator tube circuits arranged to be controlled by a mechanism that is responsive to a condition to be measured and/or controlled;

Fig. 3 is a view of a part of the mechanism shown in Fig. 2, as seen looking in the direction of arrows II—II;

Fig. 4 is a graph showing the relationship between time and the per cent of total frequency control resistance employed for controlling the operation of the tube circuits of Figs. 1 and 2, and the relationship of frequency to per cent of resistance; and Fig. 5 is a logarithmic curve representing the relationship between time and the per cent of total frequency control resistance of the tube circuit.

Throughout the drawings and the specification, like reference characters indicate like parts.

In Fig. 1 of the drawings is shown a multivibrator tube circuit comprising a multi-vibrator tube of the 6N7 type. Instead of a tube of the 6N7 type, two individual tubes of the 6V6 type may be used. Tube 2 as illustrated, has two plate-grid-cathode circuits. The one circuit comprises a plate 3, grid 4 and cathode 5; the other circuit comprises a plate 6, grid 7, and cathode 8. Cathodes 5 and 8 are connected together in a common circuit to ground through a resistance comprising resistors 9 and 10. Grid 4 is connected to ground through a condenser 11 and it is also connected through a grid leak resistor 12 to the junction points of resistors 9 and 10 as shown.

The plates 3 and 6 may be supplied with D. C. operating voltage of the order of 250 volts. The positive side of the supply voltage is connected to plate 3 through a resistor 14, while plate 6 is connected to the positive side of the supply voltage through a current pulse responsive means, such as a solenoid 15. The resistance of resistor 14 is high compared to the resistance of solenoid 15. For example, the resistance of solenoid 15 may be only one-tenth of the resistance of resistor 14. The plate side of resistor 14 is connected through a fixed resistor 17, a range adjusting adjustable resistor 18 and a frequency control resistor 19 to ground at 20. Grid 7 is connected to the junction points of resistors 17 and 18.

As shown, control resistor 19 is provided with a slider contact 21 by means of which the per cent of total resistance of the frequency control resistor 19 in circuit may be adjusted. Slide wire contact 21 may be actuated to various positions along resistor 19 by a means 22 that is responsive to some variable condition to be measured, regulated and/or controlled. The condition to be measured, regulated and/or controlled may be a variable pressure P which is supplied to a diaphragm housing 23 having a diaphragm that responds to pressure P. The diaphragm 24 is provided with a spring 25 that resists pressure P in such manner that the angular movement of slide wire contact 21 will be substantially linearly proportional to the value of pressure P.

Solenoid 15 is arranged to actuate a counter or totalizing mechanism 27 comprising an armature 28 upon which solenoid 15 acts, a pivoted arm 29 having thereon a pawl 30 disposed to actuate a ratchet wheel 31. The pawl arm 29 is returned to the zero position of its stroke by means of a spring 32. Solenoid 15 is energized intermittently with pulses of current the frequency of which varies with the position of contact arm 21 on control resistor 19. Pawl arm 29 is oscillated in accordance with the frequency of the pulses of current passing through solenoid 15 whereby the registering mechanism of totalizer 27 will record the desired information concerning the condition that the variations in pressure P reflect.

An operative circuit, such as shown in Fig. 1, may be constructed by utilizing resistors having the values of resistance indicated in the drawing and a condenser 11 having the capacity indicated.

When pressure P is zero, substantially all of resistance 19 will be out of circuit. When this condition obtains, the flow of current from the positive supply line through the series circuit comprising resistors 14, 17, and 18 to ground at 20, will be of such value that the bias voltage on grid 7 will be reduced to a value at which flow of current is prevented in the plate circuit comprising solenoid 15, plate 6 and cathode 8 to ground through resistors 9 and 10. As pressure P increases the amount of resistance 19 in circuit will be increased. As the amount of resistance increases, the voltage on grid 7 rises and becomes more positive, whereby current will flow through solenoid 15. Flow of current from plate 6 to cathode 8 operates to increase suddenly the voltage on cathode 5 which has the equivalent effect of rendering grid 4 more positive. When this condition occurs, current flows in plate circuit 3. This flow of current results in a reduction in the voltage on grid 7 so that flow of current through solenoid 15, plate 6 and cathode 8 is interrupted. After a time determined by the value of capacitance of condenser 11 and grid leak resistor 12, flow of current from plate 3 to anode 5 is interrupted. When this condition occurs, the voltage on grid 7 is again increased to a sufficiently positive value to cause current to flow from plate 6 to cathode 8 at which time solenoid 15 is again energized. As slide wire contact 21 is actuated with increasing values of pressure P to include more and more of the resistance of resistor 19 in circuit, the frequency of oscillation of the tube circuit and the number of times per second or other unit of time that solenoid 15 is energized and deenergized, will increase.

The ideal relationship desired between the frequency at which solenoid is energized per unit of time and the per cent of total resistance 19 in circuit, is a straight line as indicated by the straight-line curve in Fig. 4. In multi-vibrator circuits of the type illustrated, the ordinate "time" means the number of seconds per pulse, that is, the number of seconds per energization of solenoid 15 and frequently denotes the number of pulses per second. Time is therefore the reciprocal of frequency. If time is plotted against per cent of resistance of resistor 19 in circuit a hyperbolic curve results, as shown in Fig. 4. If the relationship between time and per cent of resistance is plotted, a logarithmic curve results, as shown in Fig. 5. In a circuit such as shown in Fig. 1, the values of resistance of resistor 19 and the capacity of condenser 11 are so selected with reference to one another that a portion of the logarithmic curve will correspond to the straight-line relationship indicated by frequency plotted against per cent of resistance in Fig. 4. By so selecting the values of capacity of condenser 11 and resistance of resistor 19 the operative frequency range of the circuit will be substantially linear with the per cent of total resistance of resistor 19 in circuit.

Tube circuits of the type shown in Fig. 1 embodying various combinations of resistance 19 and capacity values for condenser 11, do not produce a straight-line relationship between frequency and per cent of control resistance 19 over the full range of frequency of the circuit. In order that a straight-line relationship between frequency and per cent of control resistance may be obtained throughout the full range of variations of pressure P or other variables, an arrangement such as shown in Fig. 2 may be employed. The arrangement shown in Fig. 2 is one that may be utilized to measure, record and/or control the total flow of a fluid or liquid flowing through a pipe line in which is an orifice or restriction for developing a pressure differential $(P_1-P_2)$. The pressure differential $(P_1-P_2)$ across such orifice varies as the square of the flow $(F^2)$. If the control resistance of the tube circuit is adjusted in a manner that is substantially linearly proportional to pressure differential $(P_1-P_2)$, the frequency of vibration of the tube circuit will vary as $(P_1-P_2)$ or as the square of the flow $(F^2)$. The control resistance may be actuated by a square root cam or other mechanism so that the frequency of vibration or oscillation of the circuit will vary substantially linearly with flow. Such an arrangement is shown in the application of Alfred A. Markson, Serial Number 184,570, filed September 13, 1950, and assigned to Hagan Corporation, Pittsburgh, Pennsylvania.

In Fig. 2 two multi-vibrator tubes 36 and 37 and circuits therefor, are illustrated. The circuits for tubes 36 and 37 are substantially identical to the circuit shown in Fig. 1 with the exception of the mechanism by which the counter mechanism is actuated. Therefore, the components of the circuits for tube 36 that correspond with components of the circuit shown in Fig. 1 will be designated by the same reference characters with primes affixed. Similarly, the components of the circuit for tube 37 that correspond to the components of the circuit shown in Fig. 1 will be indicated by the same reference characters with double primes affixed.

The totalizing mechanism 27' of Fig. 2 is actuated by solenoids 15' and 15''. The mechanism about to be described is so arranged that solenoid 15' is operative over, say, zero to 50 per cent of the total flow range and solenoid 15'' is operative over the range from, say, 50 per cent to 100 per cent of total flow. Solenoids 15' and 15'' are provided with a common armature 40. This armature is connected to a pivoted lever arm 41 on which is mounted a pawl 42 disposed to engage the teeth on a ratchet wheel 43. As the ratchet wheel is advanced tooth by tooth in response to intermittent energization of one or the other solenoids 15' and 15'' the counter mechanism is actuated to record the total number of oscillations of the pawl arm 41 and therefore provide an integrated record of flow or an integrated record of pressure differential $(P_1-P_2)$, as the case may be.

Tube 36 and its circuit are controlled by a variable frequency control resistor 19' and tube 37 and its circuit are controlled by a variable frequency control resistor 19''. Resistors 19' and 19'' are provided with slide wire contact arms 21' and 21'' respectively, that are mounted on a shaft 45 journaled in substantially frictionless bearings 46. Associated with shaft 45 is a normally open switch 47 and a normally closed switch 48 and switch actuating arms 49 and 50 secured to the shaft.

Shaft 45 is connected to and turned by a pressure differential device 52. The particular form of device 52 illustrated, comprises a hollow ring or toroid 53 having therein a quantity of heavy liquid 54, such as mercury, for example. To ring 53 a transverse bar 55 is secured that rests at a point corresponding to the geometric center of ring 53, on a knife edge 56 or other substantially frictionless bearing. On the vertical center line of the ring and immediately above knife edge 56 is a partition 57. This partition together with the liquid 54 divides the ring into pressure chambers 58 and 59. Pressures may be introduced into chambers 58 and 59 through nipples or fittings 60 and 61. If pressure $P_1$ is connected to nipple 60 and pressure $P_2$ is connected to nipple 61 the pressure difference ($P_1-P_2$) will cause ring 53 to turn clockwise, as seen in Fig. 3.

Shaft 45 may be driven by a gear segment 63 secured to ring 53 and a pinion 64 secured to the shaft. If the ring turns counter-clockwise, as seen in Fig. 2, in response to increasing pressure differential ($P_1-P_2$), slide wire contact arms 21' and 21'' will turn clockwise, as seen in Fig. 2, or in the direction of arrows 66. If the pressure differentials are decreasing, shaft 45 and the slide wire contact arms 21' and 21'' turn in the opposite direction. Slide wire contact arms 21' and 21'' are so adjusted in position on shaft 45 that when ring 53 is in zero flow position, contact arm 21'' will be in a position corresponding substantially to zero per cent of resistance 19''. Contact arm 21' is positioned to trail contact arm 21'' so that when the pressure differential ($P_1-P_2$) corresponds to 50 per cent flow, arm 21'' will be at the zero resistance point on resistor 19'. The resistance values of resistors 19' and 19'' are so proportioned and designed with respect to the values of capacities of condensers 11' and 11'' that the frequency of vibration of the circuits of tubes 36 and 37 will produce a substantially linear relationship between frequency and the per cent of resistance of the respective frequency control resistors in circuit at any instant.

As shown in Fig. 2, switch 48 is normally closed when ring 53 is in zero flow position. This switch controls the operation of tube circuit 37. When switch 48 is open, tube 37 and its circuit are rendered inoperative. Switch 48 is opened when shaft 45 has been turned from its zero flow position to approximately 50 per cent of its full flow position. When shaft 45 arrives at approximately 50 per cent of full flow position, switch 47 is closed, thereby rendering tube 36 and its circuit operative. If desired, switches 47 and 48 may be so adjusted that they will overlap slightly or a predetermined amount in the 50 per cent of full flow position of shaft 45 or they may be so arranged that switch 47 closes at the instant that switch 48 is opened, and vice versa.

As the operation of tubes 36 and 37 and their circuits is the same as the operation of the tubes and circuit described and illustrated in Fig. 1, it is not necessary to repeat that description for the circuits of Fig. 2. It is sufficient to state that as the pressure differential responsive ring 53 travels from the zero flow to the 50 per cent flow position, more and more of the total resistance of resistor 19'' is included in the control circuit of tube 37, whereby the frequency of energization of solenoid 15' is caused to increase in a substantially linear relationship with the per cent of total resistance of resistor 19 in circuit. When the 50 per cent flow position of ring 53 is reached, tube 36 and its circuit are rendered operative for the balance of the range to 100 per cent of full flow. As the ring turns from 50 per cent to the 100 per cent of full flow position, the percentage of total resistance of resistor 19' is correspondingly increased, whereby the frequency of energization of solenoid 15' is increased in a substantially linear relationship to the per cent of total resistance in the control circuit for tube 36. By the arrangement shown in Fig. 2 substantially a straight-line operating range of the tube circuits is utilized whereby flow over the total flow range can be more accurately totalized or integrated.

Having thus described the invention, it will be apparent to those skilled in this art, that various modifications and changes may be made in the details and arrangements of the illustrated embodiments without departing from either the spirit or the scope of the invention as defined by the appended claims.

Therefore, what is claimed as new and desired to be secured by Letters Patent is:

1. A multi-vibrator comprising a pair of grid-controlled circuits each having a plate, grid and cathode, a conductor connecting said cathodes, a relatively high cathode ground resistance connected to said cathode conductor and to ground, an operating voltage input conductor to which the positive side of a source of supply of D. C. voltage is connected when the multi-vibrator is in operation, a relatively high resistance connecting one of said plates to said input conductor, a grid condenser connecting to ground the grid for the plate to which said high resistance is connected, a grid-leak resistance connected to said grid and to said cathode ground resistance at a point between the cathode and ground ends thereof, the other of said plates being provided with a current pulse responsive means of low resistance relative to the resistance in the first mentioned plate circuit and control means for causing intermittent current pulses to flow with a controlled but adjustable frequency in the plate circuit containing the current pulse responsive means, said control means comprising a fixed resistor and a frequency control resistor adapted to be adjusted by means responsive to a variable condition, said fixed and frequency control resistors being connected in series between ground and the plate side of the resistance in the first mentioned plate circuit and an electrical connection from the grid of the plate circuit containing said pulse responsive means to the junction of said series-connected fixed and frequency control resistors, the capacity of said grid condenser and the value of resistance of the frequency control resistor in circuit at any instant being such as to cause the frequency of said pulses in the pulse responsive means to be substantially linearly proportional to the per cent of the frequency control resistor in circuit at any instant.

2. A vibrator circuit according to claim 1, characterized by the fact that a range adjusting resistor is connected in series with said fixed resistor and said frequency control resistor for adjusting the range of the frequency of current pulses in the plate circuit containing said pulse responsive means.

3. A vibrator circuit according to claim 1, characterized by the fact that means responsive to said current pulses are provided for recording the total number of current pulses in said pulse circuit.

4. A multi-vibrator comprising a pair of grid-controlled circuits each having a plate, grid and cathode, a conductor connecting said cathodes, a relatively high cathode ground resistance connecting said cathode conductor to ground, an operating voltage input conductor to which the positive side of a source of supply of D. C. voltage is connected when the multi-vibrator is in operation, a relatively high resistance connecting one of said plates to said operating voltage conductor, a condenser connecting to ground the grid for the plate to which said high resistance is connected, a grid-leak resistance connecting said grid to said cathode ground resistance at a point between the cathode and ground ends thereof, a solenoid connecting the other of said plates to said supply voltage conductor, pulse counting mechanism arranged to be actuated by each of said solenoids, and control means including an adjustable frequency control resistor for causing said tube circuits to alternately pass current at an adjustable but controlled frequency, the value of the capacity of said grid condenser relative to the range of values of resistance in said control resistor being such that said solenoid is energized and de-energized at a frequency that is substantially linearly proportional to the per cent of total resistance of said control resistor in circuit at any instant, said control means comprising a fixed resistor and said control resistor connected in series between ground and the plate side of the relatively high resistance in the circuit of said first mentioned plate, and an electrical connection between the grid of the plate circuit containing said solenoid and the frequency control resistor side of said fixed series-connected resistor, said frequency control resistor being disposed for adjustment by means responsive to a variable condition, adjustment of said control resistor between values at which a substantial part thereof is shunted out of circuit and at which a maximum value of said resistor is in circuit, causing said plate circuits to be rendered alternately conducting and said solenoids to be energized with intermittent current at a frequency that is substantially linearly proportional to the per cent of total resistance of the frequency control resistor within said minimum and maximum values, in circuit at any instant.

5. A circuit according to claim 4, characterized by the fact that an adjustable range adjusting resistor is connected in series with said fixed and frequency control resistors.

6. A circuit according to claim 4, characterized by the fact that an adjustable range adjusting resistor is connected between and in series with said fixed resistor and said frequency control resistor whereby the range of frequency of intermittent current flowing in the plate circuit containing said solenoid may be pre-selected.

7. A recording apparatus comprising at least two multi-vibrator circuits provided with means for rendering said circuits operative in sequence and means for recording the output pulses of said circuits, each of said multi-vibrator circuits having two plate, grid and cathode circuits, the cathodes of said circuits being connected together, a relatively high resistance connecting each of said cathode connections to ground, an operating voltage-supply conductor adapted for connection to the positive side of a source of supply of D. C. voltage, there being in one plate circuit of each multi-vibrator circuit a plate resistor of relatively high resistance connecting the plate of that circuit to said supply conductor, a grid leak resistor for each multi-vibrator circuit connected to the grid controlling said the plate containing said high resistance, and to said cathode ground resistance at a point between the cathode and ground ends thereof, a condenser for each of the grids having a grid leak resistor for connecting said grid to ground, a plate current pulse responsive device for each multi-vibrator circuit, said responsive device being in circuit with the other of said plates and said supply voltage conductor, means for controlling the frequency of the current pulses in each of said pulse responsive devices comprising a fixed resistor and a frequency control resistor connected in series between ground and the plate side of said plate circuit resistor and a conductor connecting the frequency control resistor side of said fixed resistors to the respective grids of the circuits containing said current pulse responsive means, the values of capacity of said grid condensers and the resistance of said frequency control resistors being such that the frequencies of said pulses are substantially linearly proportional to the per cent of total resistance of the frequency control resistors in circuit at any instant means for adjusting the frequency control resistors of said vibrator circuits to vary the resistance thereof in circuit between predetermined minimum and maximum values, and means for selectively rendering first one and then the other of said two circuits operative, whereby the current pulse responsive means may be operated over two different ranges of frequencies determined by the minimum and maximum values of resistance of each of said frequency control resistors in circuit, one range of frequency being bounded by a minimum and a maximum value, and the other range being bounded by said maximum value and a still higher maximum value.

8. A multi-vibrator circuit apparatus comprising two grid controlled circuits as defined by claim 4, characterized by the fact that means are provided that are responsive to and actuated by the respective solenoids of each pair of grid controlled circuits in accordance with the frequency of said pulses, and that means are provided for rendering first one pair of grid controlled circuits operative and then the other, and that means are provided for so adjusting the frequency control resistors therefor that one of said pairs of grid controlled circuits will produce intermittent energization of one of said solenoids over one range of pulse frequencies and the other of said pair of grid controlled circuits will produce intermittent energization of the other of said solenoids over a higher range of frequencies.

9. A vibratory circuit apparatus according to claim 8, characterized by the fact that the frequency control resistors for each of said pairs of grid controlled circuits each comprises a slide wire and slide contact arm connected to said wire and to ground, means for moving said contact arms in response to a variable condition between positions corresponding to minimum and maximum resistance, and means actuated by said contact arm moving means for rendering the circuits controlled by said slide wire resistors operative in sequence over the ranges defined by the minimum and maximum resistance positions of said slide wire contact arms, the resistance range of one slide wire resistor producing a frequency range of intermittent energization of the solenoid in the circuit controlled thereby corresponding to a portion of the range of variation of said variable condition and the other resistor producing a range of different frequency of intermittent energization of the solenoid in the other plate circuit controlled thereby, said latter range of frequencies corresponding to another portion of the range of variation of said variable condition.

10. A vibratory circuit apparatus according to claim 8, characterized by the fact that the frequency control resistors for each of said pairs of grid controlled circuits each comprises a slide wire and slide contact arm connected to said wire and to ground, means for moving said contact arms in response to a variable condition between positions corresponding to minimum and maximum values of resistance within which values the frequency of pulsation is substantially linearly proportional to the values of resistance in circuit at any instant, and means actuated by said contact arm moving means for rendering the circuits controlled by said slide wire resistors operative in sequence over the ranges defined by the minimum and maximum resistance positions of said slide wire contact arms, the resistance range of the slide wire resistor producing a frequency range of intermittent energization of the solenoid in the circuit controlled thereby corresponding to a portion of the range of variation of said variable condition and the other resistor producing a range of different frequency of intermittent energization of the solenoid in the other plate circuit controlled thereby, said latter range of frequencies corresponding to another portion of the range of variation of said variable condition, and means actuated by said solenoids for registering the total number of energizations of each of said solenoids.

11. A vibratory circuit apparatus comprising two grid controlled circuits as defined by claim 4, characterized by the fact that pulse registering means are provided that are responsive to and actuated by the respective solenoids of each pair of grid controlled circuits, and that means are provided for rendering first one pair of grid controlled circuits operative and then the other, that means are provided for so adjusting the frequency control resistors therefor that one of said pairs of grid controlled circuits will produce intermittent energization of one of said solenoids over one range of frequencies and the other of said pair of grid controlled circuits will produce intermittent energization of the other of said solenoids over a higher range of frequencies, and that means actuated by said solenoids are provided for registering the total number of energizations of each of said solenoids.

THOMAS E. HAYES.

References Cited in the file of this patent

UNITED STATES PATENTS

| Number | Name | Date |
|---|---|---|
| 1,995,890 | Lord | Mar. 26, 1935 |
| 2,342,753 | Pearson et al. | Feb. 29, 1944 |
| 2,356,071 | Macdonald et al. | Aug. 15, 1944 |
| 2,494,353 | Newman | Jan. 10, 1950 |
| 2,495,684 | Bartels | Jan. 31, 1950 |
| 2,527,023 | Millen | Oct. 24, 1950 |